8/24/82  XR  4,345,482

United States Patent [19]
Adolfsson et al.

[11] 4,345,482
[45] Aug. 24, 1982

[54] FIBER OPTICAL DEVICES FOR MEASURING PHYSICAL PHENOMENON

[75] Inventors: Morgan Adolfsson; Torgny Brogardh, both of Vasteras, Sweden

[73] Assignee: ASEA Aktiebolag, Vasteras, Sweden

[21] Appl. No.: 94,097

[22] Filed: Nov. 14, 1979

[30] Foreign Application Priority Data

Nov. 16, 1978 [SE] Sweden .................................. 7811821

[51] Int. Cl.³ ................................................ G01L 1/10
[52] U.S. Cl. ................................. 73/862.59; 73/653; 73/702; 374/117
[58] Field of Search ........... 73/DIG. 1, 517 AV, 579, 73/581, 653, 655, 702, 704, 778, 862.59, 339 A; 250/227; 331/155

[56] References Cited

U.S. PATENT DOCUMENTS 3,036,465  5/1962  Dicke .......................... 73/517 AV
3,831,137  8/1974  Cuomo .............................. 73/653

FOREIGN PATENT DOCUMENTS 239823  12/1969  U.S.S.R. ............................. 331/155

OTHER PUBLICATIONS

Zak, et al., *Measurement Techniques* vol. 19, No. 5, pp. 698-700, May 1976.

*Primary Examiner*—Charles A. Ruehl
*Attorney, Agent, or Firm*—Watson, Cole, Grindle & Watson

[57] ABSTRACT

The invention relates to a fiber optical device for measuring physical magnitudes such as force, elongation, pressure, acceleration, temperature, etc., comprising a transducer unit and an electronic unit, in which the quantity to be measured is supplied to the transducer unit to affect the resonance frequency of an oscillating body included in the tansducer unit by changing the dimensions, mass, density, modulus of elasticity and/or mechanical stress of the body. A property of the body oscillation, such as frequency, phase position and/or amplitude, is used as a value of the quantity to be measured. The oscillations of the body are detected optically by means of a fiber optical position/movement detector.

20 Claims, 13 Drawing Figures

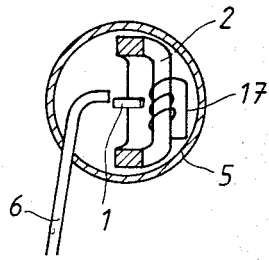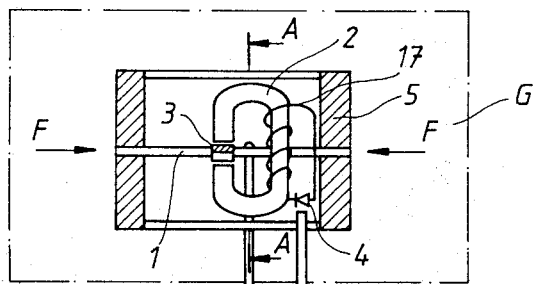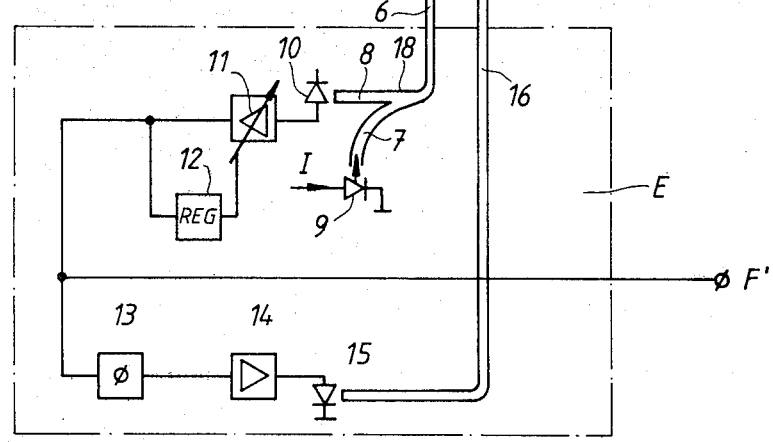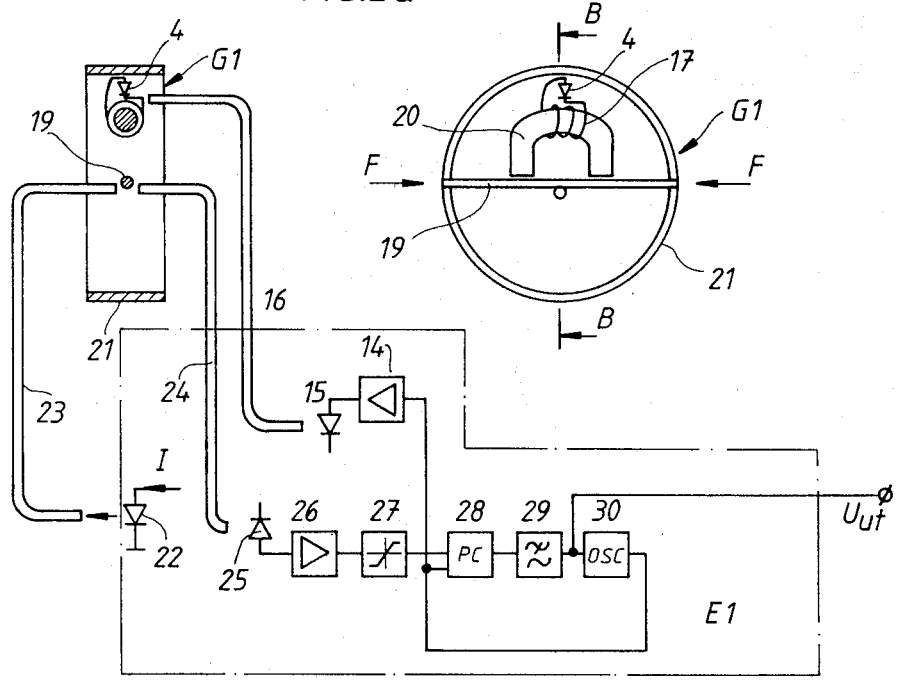

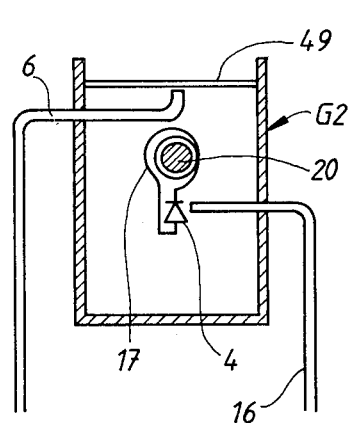
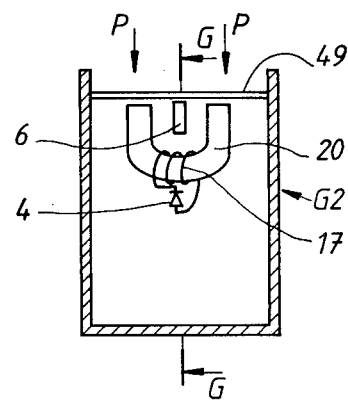
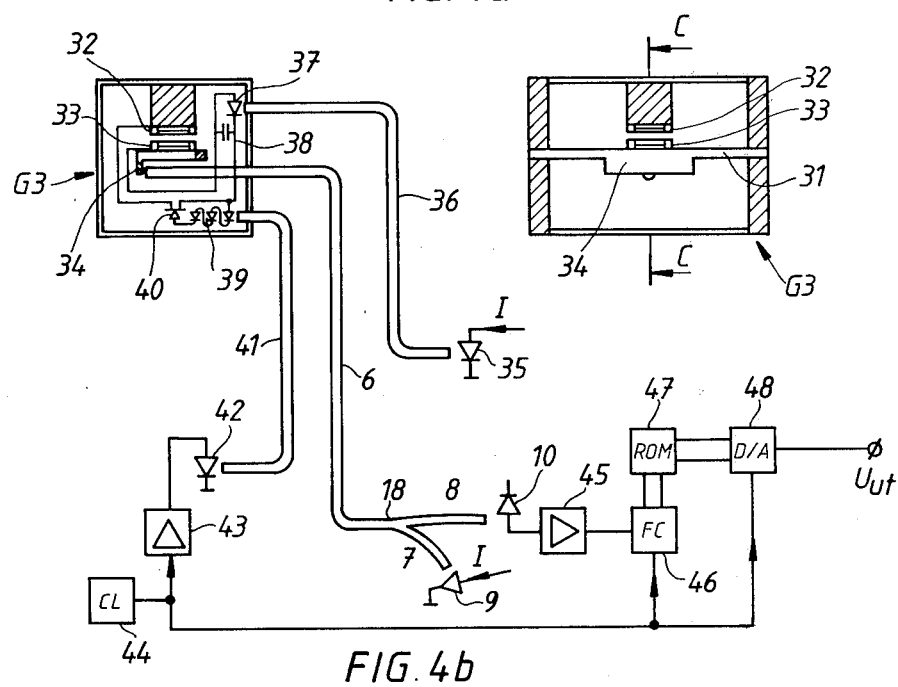

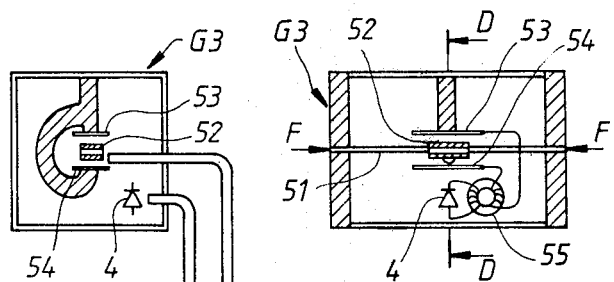
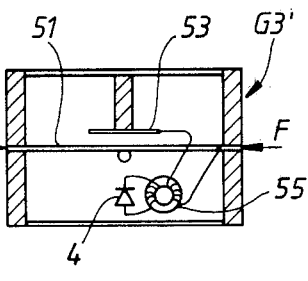
FIG. 5a  FIG. 5b  FIG. 5c
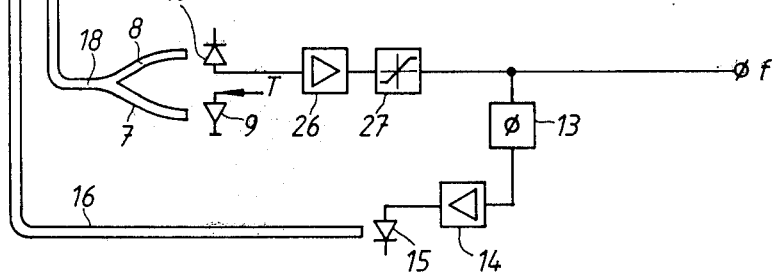
FIG. 6a
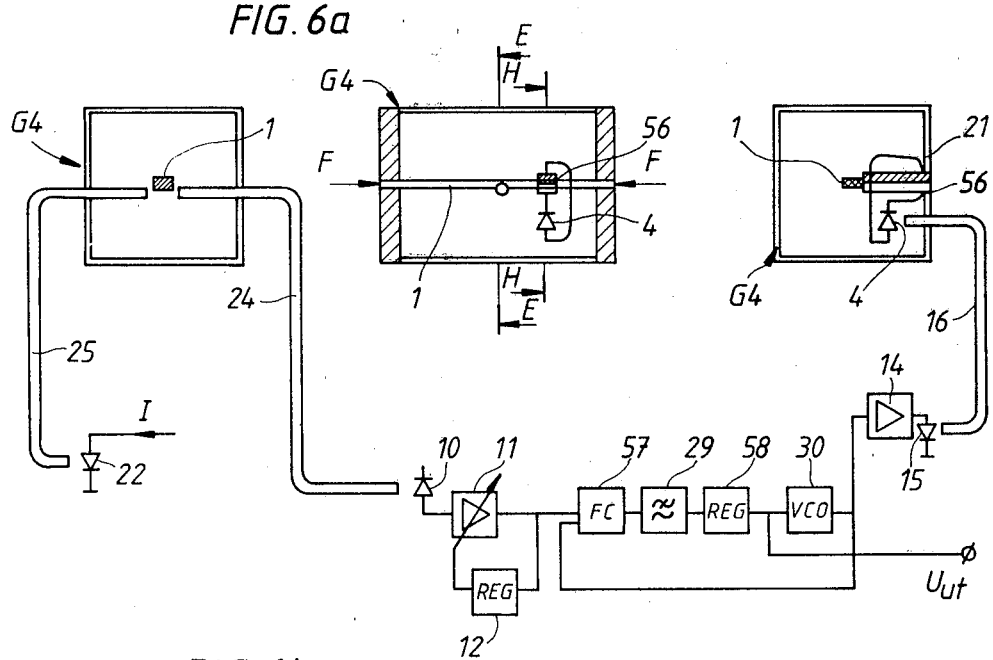
FIG. 6b

FIBER OPTICAL DEVICES FOR MEASURING PHYSICAL PHENOMENON

BACKGROUND

FIELD OF THE INVENTION

The present invention relates to a fiber optical device for measuring physical magnitudes such as force, elongation, pressure, acceleration, temperature, etc., and comprises a transducer unit and an electronics unit, in which the quantity to be measured in supplied to the transducer unit to affect the resonance frequency of an oscillating body included in the transducer unit by changing the dimensions, mass, density, modulus of elasticity and/or mechanical stress of the body. The properties of the body oscillation, such as frequency, phase position and/or amplitude, are used as a value of the quantity to be measured.

SUMMARY OF THE INVENTION

In measuring devices of the type specified herein it is desirable to achieve a high accuracy of measurement and at the same time independent of an adverse environment at the point of measurement (e.g. an explosive and/or corrosive environment), aging of components included in the device, and so on. It is also advantageous to simply convert measurement signals into digital form. It is desirable to eliminate the affect of disturbances, that is, to suppress them, and to have flexibility between the possibility of using the measuring device not only for force and pressure, but also for temperature, acceleration, level and flux measurements. It is also desirable to carry out measurements at a high electric potential and in difficult environments without neglecting the demands for security and accuracy.

The invention aims to provide a solution to the problems mentioned above and other problems associated therewith, and is characterized in that oscillations of a body are optically detected by a fiber optical position/movement detector. In a device of this kind a high accuracy of measurement may be obtained because of the high resolution during the optical measurement. Insensitivity to electromagnetic disturbances, a good galvanic insulation between the transducer and the electronics unit, good inherent safety characteristics (e.g. safety against explosion), and insensitivity against radioactive radiation are also obtained. The device is also capable of operating in corrosive or explosive environments and in case of poor visibility conditions. The inventive device also makes it possible to operate relatively independently of instabilities and aging phenomena of the components of the device.

In a preferred embodiment the energy required for exciting oscillations is transmitted to the mechanical body optically, and a suitable transmitting medium is optical fibers. Because of the high resolution of the optical detector system, the optically transmitted power results in oscillations of an order of magnitude that may be utilized in practice.

BRIEF DESCRIPTION OF THE FIGURES

The invention is exemplified in greater detail in the accompanying drawings, of which:

FIG. 1a shows an embodiment with a measurement quantity-dependent wire oscillating in a magnetic field;

FIG. 1b shows a section along line A—A in FIG. 1a;

FIG. 2a shows an alternative embodiment of a measuring transducer in which the optical signal is modulated by an oscillating body, and the transducer is shown in cross section along line B—B of FIG. 2a in accompanying FIG. 2b which illustrates another embodiment of a measuring device;

FIG. 3a shows an application of a transducer for pressure gauging with a membrane reflecting the optical signal, and FIG. 3b shows a section along line G—G of the transducer in FIG. 3a;

FIG. 4a shows a measuring transducer with an optically coupled temperature sensor, and FIG. 4b shows an embodiment using the transducer of FIG. 4a with the transducer shown in cross section along line C—C of FIG. 4a;

FIGS. 5a and 5b each show fiber-optically coupled force transducers with an oscillating string, and FIG. 5c illustrates an embodiment of a measuring device showing the transducer of FIG. 5a in cross section aong line D—D of that Figure; and FIG. 6a shows an alternative embodiment of an optically coupled force transducer with accompanying FIG. 6b showing two cross-sections of the force transducer taken along lines E—E and H—H of FIG. 6a.

DETAILED DESCRIPTION

FIG. 1a shows an optically coupled force transducer which is constructed in accordance with the principle that the resonance frequency of a mechanical body is dependent on the force to which the body is subjected. The measuring device includes transducer unit G and electronics unit E, which are interconnected by fiber optical conductors 6, 16. The distance between transducer G and electronics section E may vary up to several kilometers.

Attached to transducer unit G is steel spring 1, made of a material with a given modulus of elasticity, but other similar materials are also usable. With additional reference to FIG. 1b, spring 1 is attached to transducer housing 5 and permanent magnet 3 is attached to the spring. Spring 1 is then subjected to force F that is to be measured. Permanent magnet 3 is placed in an air gap in iron core 2 in a magnetic field produced by an electromagnet with coil 17, and this results in oscillations of spring 1 when coil 17 is excited by an alternating current. Transducer G operates as an oscillator.

The alternating field of magnet 3, that is, the alternating current in coil 17, is generated by lighting photodiode 4 which drives current through coil 17. This results in oscillations occurring in spring 1 because of the interaction of spring 1 with the alternating magnetic field.

The movement of spring 1 is detected by conducting light from current-excited light-emitting diode (LED) 9 via light conductor fiber 7 and fiber branch 18 through light conductor fiber 6. Part of the light from fiber 6 is reflected against the edge of spring 1 and back into fiber 6, and from there via branch 18 and light conductor fiber 8 to photodiode 10. The light which is reflected against spring 1 (see FIG. 1b) and back into fiber 6 to diode 10 becomes dependent on the position of spring 1 relative to the end of fiber 6, and this results in a light modulation as a function of the position of spring 1. The signal from diode 10 thus becomes dependent on force F. The current from photodiode 10 passes through amplifier 11 having automatic amplitude control. External vibrations on transducer G may excite considerable oscillations of spring 1, and to prevent over-regulation the amplification in amplifier 11 must be reduced so that its output signal is held at a constant amplitude. At the same time compensation for aging of the included electro-optical components is obtained. The amplification of amplifier 11 is thus variable and is set by regulator 12 by automatic gain control such that the output signal from amplifier 11 becomes constant. The frequency of the output signal from amplifier 11 is the output signal of transducer G. This signal passes via phase-shifting network 13 and amplifier 14 to LED 15.

The light from LED 15 is conducted via light conductor fiber 16 to photodiode 4 and thus generates oscillations in spring 1. The phase shift in device 13 is selected so that the measurement system forms a feedback-coupled oscillator in which transducer G is the frequency-determining element.

To obtain an output signal proportional to force F, signal F′ from amplifier 11 may pass through a frequency-to-voltage convertor (not shown) and thereafter be linearized in a manner well known to those skilled in the art. The resonance frequency of spring 1 is dependent on force F.

FIG. 2a shows a fiber-optically coupled force transducer, in which force F is converted into a resonance frequency of suspended wire 19. The detection is carried out by means of a fixed loop. With reference to FIG. 2b, LED 22, excited by current I, provides a constant light flux into light conductor fiber 23, which terminates in transducer G1. The light from fiber 23 is switched in the transducer to second light conductor fiber 24 and is conducted from there back to electronics unit E1 and there to photodiode 25. Wire 19 is located between ends of light conductor fibers 23 and 24 in transducer G1, and the resonance frequency of wire 19 is determined by the stress therein and thus by force F by which transducer G1 is influenced. Since wire 19 only partially covers the end surfaces of fibers 23, 24, the light coupling is modulated by the movement of wire 19, and the signal into photodiode 25 represents the position of wire 19. The current from photodiode 25 is amplified in amplifier 26, and the amplified signal passes through amplitude limiting circuit 27, where the signal is converted into a square wave which is passed to phase comparison device 28. In phase comparison device 28 the phase of the square wave from circuit 27 is compared with the phase of the signal from voltage-controlled oscillator (VCO) 30. The phase deviation causes a signal which, after low pass filtering in filter 29 of the output signal from phase comparison device 28, forms a control signal to oscillator 30, the frequency of which is changed until the phase deviation becomes constant. The control signal to oscillator 30 is a voltage, proportional to the frequency of oscillating wire 19, and is therefore taken as an output signal $U_{ut}$, proportional to force F.

The output signal from oscillator 30 is amplified in amplifier 14, the output signal of which drives LED 15. The light from LED 15 is switched via fiber 16 to photodiode 4 which generates a current through coil 17 on magnet 20 (FIG. 2a). The current through coil 17 generates a magnetic field in magnet 20, which excites resonance oscillations in wire 19. Measuring signal $U_{ut}$ is shown in FIG. 2b, and is representative of force F that is to be measured by the device.

FIG. 3a shows an alternative embodiment of transducer G2 to be used together with opto-electronics unit E according to FIG. 1a. The device is an optically coupled pressure transducer (see arrows P in FIG. 3a), which is based on the principle that the resonance frequency of membrane 49 is dependent on the deflection thereof and thus on pressure P applied thereto. The oscillations of membrane 49 occur because light in light conductor fiber 16 supplies current through coil 17 wound around magnet 20 via photodiode 4, with magnet 20 attracting membrane 49. The oscillations of membrane 49 are detected because part of the constant light flux from light conductor fiber 6 (see FIG. 3b which is a section along lines G—G of FIG. 3a) is reflected against membrane 49 and back into fiber 6. The quantity of light being reflected by membrane 49 depends on the distance from membrane 49 to fiber end 6 in transducer G2 and is therefore a measure of the deflection of membrane 49. Transducer G2 is connected by light conductor fibers 6 and 16 to a receiver unit such as electronics unit E of the same design as for the force measuring device in FIG. 1a.

The device according to FIG. 4a is an optically coupled temperature transducer, in which temperature changes result in a changed modulus of elasticity of axle 31 which oscillates torsionally. The resonance frequency for the oscillations represents the temperature, provided that the clamping force for axle 31 is constant. The resonance frequency is determined by oscillations excited by a current surge through two parallel coils 32, 33, whereafter the frequency of the subsequent oscillations is measured.

With reference to FIG. 4b, current through LED 35 generates light which is conducted via light conductor fiber 36 to photodiode 37, the output current of which charges capacitor 38. Capacitor 38 is discharged through two parallel coils 32 and 33 by field effect transistor 40 starting to become conductive. Because one coil 33 is fixed to center portion 34 on axle 31 (reference FIG. 4a) and the other coil 32 is fixedly mounted, the force action between coils 32, 33, which is caused by the current surge, gives rise to torsional oscillations of axle 31. Field effect transistor 40 is controlled from control logic unit 44 via amplifier 43, which in turn energizes LED 42 to generate light that is conducted through light conductor fiber 41 to series-connected photodiodes 39, which provide a control voltage to field effect transistor 40. The oscillations are detected by conducting light from photodiode 9 via light conductor fiber 7, fiber branch 18 and light conductor fiber 6 to the edge of center portion 34 of torsion axle 31. Depending on the position of the center portion edge relative to the end of light conductor fiber 6, part of the light is reflected back into fiber 6. Part of this light reaches photodiode 10 after reflection from center portion 34, and after passage through fiber branch 18 and light conductor fiber 8. The signal from photodiode 10 is amplified in amplifier 45 and then passes to frequency counter 46. A signal from control logic unit 44 synchronizes the frequency measurement to the time immediately after the oscillations have been excited. The digital output signal from frequency counter 46 forms the address signal to memory (ROM) 47, which includes a linearizing table. To obtain an analog output signal, the output signal from memory 47 is allowed to pass through digital/analog convertor 48, which provides the analog measured value as an output signal. The frequency of the AC portion of the signal amplified in amplifier 45 is thus measured in frequency counter 46.

FIGS. 5a and 5b show fiber-optically coupled force transducers, based on the principle of an oscillating string. To excite oscillations, FIG. 5a shows transducer G3 using two capacitor plates 53 and 54. A piece of ferro-electrical material 52, which is attached to the oscillating string 51 (generally designated the body) and placed in the field between plates 53, 54 is subjected to a force which generates oscillations in the string. For transducer G3' shown in FIG. 5b, the excitation is caused directly without the use of a ferro-electrical material by the action of the force between fixed capacitor plate 53 and oscillating string 51 when an electric voltage is applied therebetween.

The transducer portion for transducer G3 in FIGS. 5a and 5c operates analogously with the corresponding portion for transducer G in FIG. 1a with the difference that controllable amplifier 11 and the regulator 12 are replaced by amplifier 26 with constant amplification followed by amplitude limiting circuit 27. Oscillations are excited by the fact that light in light conductor fiber 16 generates a voltage across photodiode 4. This voltage is stepped-up in transformer 55, the outputs of which are connected to capacitor plates 53 and 54. String 51, with the attached piece of ferro-electrical material 52 is located between capacitor plates 53, 54. In the field between capacitor plates 53, 54, ferro-electrical material 52 and thus string 51 are subjected to a force proportional to the voltage between the capacitor plates, and that force F excites oscillations. The oscillations are detected by reflection of part of the light from light conductor fiber 6 against the edge of string 51, which partly covers the end surface of light conductor fiber 6 and returns back into the fiber. The intensity of the reflected light is thus modulated by the movement of string 51 relative to the end of fiber 6. Transducer G3' in FIG. 5b operates analogously as transducer G3 in FIG. 5a, but oscillations are excited by the action of the force between fixed capacitor plate 53 and movable string 51 when the output voltage from transformer 55 is connected between them.

The device shown in FIG. 6a is an optically coupled force transducer G4 in which force F causes a change of the voltage of string 1 and therefore an alteration of the resonance frequency across the string. The excitation of oscillations takes place by amplifier 14 driving current through LED 15, and the light from LED 15 is conducted via light conductor fiber 16 to photodiode 4 in the transducer unit G4. The light impinging on photodiode 4 causes a voltage thereacross, which is switched to either side of a piezo-electric element of bimorphous, alternatively multimorphous structure 56. The voltage across piezo-electric element 56 results in a deflection of one end thereof, which end is mechanically connected to string 1. Since the other end of piezo-electric element 56 is fixedly mounted to transducer wall 21, the voltage to piezo-electric element 56 gives rise to a deflection of string 1. The oscillations of string 1 are detected by current-excited LED 22 giving a constant light flux into light conductor fiber 25, from where the light is switched to receiver light conductor fiber 24. String 1 enters partly between the end of fibers 23 and 24 in the transducer G4, so the light which is switched into fiber 24 is modulated by the movements of string 1. The light in fiber 24 passes to photodiode 10, the output current of which is amplified in controllable amplifier 11. The amplification in amplifier 11 is set by means of regulator 12, so that the output signals of amplifier 11 maintain a constant amplitude. Amplifier 11 is therefore an amplifier with automatic amplitude control. The signal from amplifier 11 passes to frequency comparing device 57, where the frequency of amplifier 11 is compared with the frequency of the signal from voltage-controlled oscillator 30 (VCO), which provides a signal to amplifier 14 for the excitation of LED 15. The difference in frequency gives an output signal from frequency comparing device 57, which after filtering in low pass filter 29 passes into regulator 58, which provides a control signal to voltage-controlled oscillator 30. Since the control signal is proportional to the resonance frequency of string 1, it may be utilized as measuring signal $U_{ut}$. The receiver section E4 is in this case constructed as a fixed-frequency loop.

The light may also reflect against a mirror, partly covering the end surface of the fiber and being arranged to move in a plane parallel to the end surface thereof, or against a mirror which is completely or partly covered by the fiber end and which has its direction of movement perpendicular to the end surface thereof.

As mentioned above, similar devices may be used for measuring not only force and pressure, but also elongation, acceleration, temperature, and so on, and the device according to the above may be varied in many ways within the scope of the following claims.

What is claimed is:

1. Fiber optical device for measuring physical phenomenon, comprising:
   a transducer unit including an object mounted therein and adapted to oscillatate at a resonant frequency thereof and having a property of oscillation altered in response to a change in physical characteristic of said object induced by stimulus of the physical phenomena being measured, and including at least one light conducting fiber having a fiber optical position/movement detector element mounted in operative association with said object to detect said altered oscillation property;
   processing means for generating an output signal representative of the phenemena being measured in response to an output of said fiber optical detector element; and
   excitation means for generating energy causing said object to oscillate, and including optical transmission means for transmitting oscillating energy to said transducer unit, said means for transmitting including at least one light conducting fiber for optically transmitting said oscillating energy.

2. A device as in claim 1 wherein said excitation means further includes means for converting the optical oscillating energy into electrical energy.

3. A device as in claim 2 wherein said exciting means further includes at least one electrical coil for receiving said electrical energy to generate an energy field, said object being at least partially mounted within said energy field.

4. A device as in claim 3 wherein said exciting means further includes a magnet having an air gap, said object being magnetic and at least partially extending within said air gap and said at least one coil energizing said magnet.

5. A device as in claim 3 wherein said exciting means further includes a magnet having an air gap, said object including a permanent magnet mounted on said object and extending within said air gap and said at least one coil energizing said magnet.

6. A device as in claim 3 wherein there are two coils, one of said coils being mounted to said transducer unit and the other coil being mounted in spaced relation therefrom on said object and said object is magnetic.

7. A device as in claim 6 wherein said excitation means further includes means for storing said electrical energy, second light conducting fiber means for transmitting an optical control signal, and means for discharging said means for storing in response to said optical control signal.

8. A device as in claim 2 wherein said exciting means includes at least one capacitor plate mounted in spaced relation to said object, and said electrical energy being applied to said capacitor plate and said object.

9. A device as in claim 8 wherein said exciting means includes a pair of spaced capacitor plates with said object being mounted therebetween and said electrical energy being applied across said two capacitor plates.

10. A device as in claim 9 wherein said exciting means includes a step-up transformer responsive to said electrical energy and the output of said transformer being supplied to said pair of spaced capacitor plates.

11. A device as in claim 8 wherein said exciting means includes a step-up transformer responsive to said electrical energy and the output of said transformer being supplied to said at least one capacitor plate.

12. A device as in claim 11 wherein said transducer further includes a ferro-electric material applied to said object such that said ferro-electric material is affected by the electric field between said two capacitor plates.

13. A device as in claim 2 wherein said excitation means further includes at least one piezo-electric element mounted to said object and said electrical energy is applied to said piezo-electric element.

14. A device as in claim 2 wherein said excitation means includes a multimorphous element mounted to said object and said electrical energy is applied to said multimorphous element.

15. A device as in claim 1 wherein said altered oscillation property is an alteration of the phase of oscillation, and said excitation means includes phase changing means responsive to the output of said means for detecting such that said phase changing means and said object form a feedback-coupled oscillator, the oscillating frequency of which is determined by the resonant frequency of said object.

16. A device as in claim 1 wherein said altered property is an alteration of the phase of oscillation, said excitation means includes a voltage-controlled oscillator and phase difference detecting means for determining the difference between the phase of the voltage-controlled oscillator output and said output signal for generating a control signal, said voltage-controlled oscillator being responsive to said control signal and said control signal being a function of the resonant frequency of said oscillating object.

17. A device as in claim 1 wherein said excitation means includes voltage-controlled oscillator means and frequency comparing means for determining the difference in frequency between the output of said voltage-controlled oscillator means and said output signal to generate a control signal, said voltage-controlled oscillator means being controlled by said control signal, said control signal being a function of the resonant frequency of said oscillating object.

18. A device as in claim 1 wherein said processing means includes means for counting the frequency of the object oscillations during a first time interval, means for storing linearizing signals selected by the output of said means for counting, and means for converting the selected linearizing signal to provide an analog output representative of the measured phenomena.

19. A device as in claim 1 wherein said transducer includes two light conductor fiber elements mounted within said transducer with their respective ends in opposing relationship, the ends of said two light conducting fiber elements constituting said fiber optical position/movement detector element, one of said light conducting fiber elements emitting a constant light flux onto said object, and the other light conducting fiber element receiving light flux dependent on the position of said object relative thereto.

20. A device as in claim 1 wherein said object has a light reflecting surface, said at least one light conducting fiber emits light onto said reflecting surface, the light reflected from said reflecting surface being sensed by said fiber optical position/movement detector element such that the reflected light is representative of the oscillation of said oscillating object relative to said fiber optical position/movement detector element.

* * * * *